United States Patent [19]
Vanjani

[11] 3,976,924
[45] Aug. 24, 1976

[54] SINGLE PHASE, TWO POLE A.C. RESISTANCE SPLIT-PHASE UNIDIRECTIONAL INDUCTION MOTOR

[75] Inventor: Chandu R. Vanjani, Dayton, Ohio

[73] Assignee: A.O. Smith Corporation, Milwaukee, Wis.

[22] Filed: Oct. 24, 1974

[21] Appl. No.: 517,525

[52] U.S. Cl. .................. 318/220 R; 318/221 E; 318/225 R
[51] Int. Cl.² .......................................... H02P 1/44
[58] Field of Search ........ 318/220 R, 221 E, 221 G, 318/221 R, 225 R

[56] References Cited
UNITED STATES PATENTS

| | | | |
|---|---|---|---|
| 2,139,531 | 12/1938 | Wedge et al. | 318/221 G |
| 2,588,257 | 3/1952 | Lewus | 318/221 G |
| 2,711,503 | 6/1955 | Elliott | 318/221 G |
| 3,204,167 | 8/1965 | Zigler | 318/225 R |

*Primary Examiner*—Gene Z. Rubinson
*Attorney, Agent, or Firm*—Andrus, Sceales, Starke & Sawall

[57] ABSTRACT

A single phase, two pole A.C. split-phase unidirectional induction motor uses a current sensing relay and connects a main winding with a single phase A.C. electrical power source while a pair of associated relay-contacts operably connect a starting winding to the power source with the contacts closing in response to a sensed first predetermined main winding current and opening in response to a second lesser predetermined main winding current. Each of the starting winding poles are spaced from each of the main winding poles by less than ninety physical degrees in the direction of rotor rotation in order to provide the first predetermined main winding current at a first predetermined rotor speed and the second predetermined main winding current at a second predetermined speed and torque to maintain the heating of the starting winding within a predetermined temperature while the pair of relay contacts remain in the closed condition.

1 Claim, 4 Drawing Figures

SINGLE PHASE, TWO POLE A.C. RESISTANCE SPLIT-PHASE UNIDIRECTIONAL INDUCTION MOTOR

BACKGROUND OF THE INVENTION

This invention relates to a single phase, two pole A.C. split-phase unidirectional induction motor of the resistance split-phase type.

Single phase induction motors have customarily been designed and utilized for fractional horsepower application and have generally been classified in accordance with the methods of starting. Several types of single phase induction motors include split-phase motors, capacitor start-induction run motors, permanent split capacitor motors, two value capacitor motors and shaded pole motors, for example.

The capacitor type motors generally employ a capacitor in series with the starting winding to provide a phase displacement of currents in the starting and running windings to produce starting torques. Such capacitors in some applications are permanently connected to the winding construction while other motors selectively remove such starting capacitors by either a speed responsive switch or a current responsive relay. Some single phase induction motors which have employed capacitors within their starting field winding have employed non-quadrature windings in which the starting field winding has been displaced out of quadrature with the main field winding in a direction opposite to the direction of rotor rotation.

Many prior resistance split-phase induction motors have employed starting windings wound to have a higher resistance than the main windings and frequently provide additional resistance connected in series therewith so that the difference in resistance of the respective main and starting winding circuits provides the requisite phase displacement for providing starting torque to the motor. Certain types of resistance split-phase constructions have employed centrifugal switches for sensing the rotor speed to disconnect the starting winding in response to the rotor reaching a predetermined speed. Such disconnection of the starting winding by a centrifugal switch ensures that the heating of the starting winding does not become excessive by the motor operating to higher speeds.

Other resistance split-phase motors and particularly those which are hermetically sealed in a compressor hve employed a current relay which responds to the current flowing through the main winding to selectively disconnect the starting winding from the energizing source in response to a sensed predetermined main winding current. With all of the coils of the starting winding wound in the forward or same direction and spaced in quadrature from the main winding coils, in such a resistance split-phase motor, the main winding current, necessary to actuate the sensing relay for disconnecting the starting winding, generally requires the motor to attain an excessive speed and consequent low torque thereby resulting in an excessive heat buildup within the starting windings. The resistance of such a starting winding could be increased in an attempt to reduce the heating thereof by adding additional forward turns to the starting winding. Such added forward turns, however, increases the reactance thereof which increases the main winding current with respect to the rotor speed so that the motor must accelerate to an excessive speed before the main winding current will decrease to a magnitude whereat the current relay will disconnect the starting winding. Thus, added forward turns only to a quadrature type starting winding increases the heating problems in the starting winding. Such an excessive heat buildup may, in fact, burn out or short the starting winding thereby rendering the motor inoperative and, in any event, the starting winding would be disconnected while the motor is providing a substantially lower torque output.

The heating problems of the generally smaller diameter wire in the starting windings used in resistance split-phase induction motors, having quadrature windings, have been substantially reduced by employing a number of reverse or back turns within the starting winding which have increased the resistance thereof to reduce the heating rate while also decreasing the mutual reactance with the main winding to ensure that the current relay disconnects the starting winding at the proper speed and torque level. Additional forward turns have to be employed with the reverse turns in the starting winding of such motors and frequently equal the number of reverse turns to maintain the desirable torque output of the motor while maintaining the heating rate of the starting winding within tolerable limits by disconnecting the starting winding at the proper speed and torque level.

While the employment of reverse or back turns and correspondingly added forward turns to the starting winding in quadrature type resistance split-phase induction motors has provided a desirable commerical motor, such structure requires the employment of large amounts of additional wire together with additional time consuming steps of fabrication, thus increasing the cost of each motor.

SUMMARY OF THE INVENTION

This invention relates to a single phase, two pole A.C. split-phase unidirectional induction motor of the resistance split-phase type.

The invention provides a highly desirable induction motor of the resistance split-phase type in which a major portion of the forward turns and the reverse or back turns of wire employed within the starting winding of prior motors have been eliminated while maintaining the heating thereof and the torque at relay drop out within desirable limitations.

Specifically, a stator core assembly provides a plurality of circumferentially spaced coil receiving slots communicating with a substantially cylindrical bore adapted to rotatably receive a rotor which selectively rotates in a predetermined direction, hereafter referred to as the first direction. The main winding includes a plurality of coils located within certain stator slots and are spaced on opposite sides of the bore to form a pair of main winding electrical poles forming a main field axis. A starting winding includes a plurality of coils located within certain stator slots and are spaced on opposite sides of the bore to form a pair of starting winding electrical poles forming a starting field axis spaced out of quadrature from the main field axis. Each of the starting winding poles is spaced from each of the main winding poles by less than 90 physical degrees, in the first direction, to provide a first predetermined main winding current at a first predetermined speed and a second predetermined main winding current, less than the first current, at a second predetermined speed and torque. A current relay is connected to a source of single phase A.C. electrical power and to the main winding to sense the main winding current. A pair of contacts, associated with and controlled by the relay, connects the source to the starting winding and selectively transfers such contacts to a closed condition in response to the relay sensing the first predetermined main winding current to supply energizing power to the starting winding. The pair of contacts are selectively transferred to an open condition in response to the relay sensing the second predetermined main winding current to disconnect the starting winding from the power source at the second predetermined speed and torque to maintain the heating of the starting winding within a predetermined temperature while the pair of contacts remain in the closed condition.

A highly desirable single phase resistance split-phase type induction motor is thus provided in which back turns (or the like) and a major portion of equal number of forward turns, used in the starting winding of the prior art, have been eliminated, resulting in great savings in the quantity of wire used in the starting winding. While it is true that the theory of using non-quadrature windings has long been known as evidenced by the articles of W. V. Lyon and C. Kingsley, Jr., Analysis of Unsymmetrical Machines, May 1936 Electrical Engineering, pages 471–76; A. F. Puchstein and T. C. Lloyd, Capacitor Motors With Windings Not In Quadrature, November 1935 Electrical Engineering, pages 1235–39; S. S. L. Chang, Equivalence Theorems, Analysis, and Synthesis of Single-Phase Induction Motors With Multiple Nonquadrature Windings, October 1956 AIEE, pages 913–16; it is not believed that anyone has provided a successful resistance split-phase motor which has solved the heating problems of the starting winding by using a current relay in the manner described above.

In a preferred construction of the invention, the induction motor employs four coils per pole within the starting winding and five coils per pole within the main winding, the former being spaced from each of the main winding coils by less than ninety physical degrees in the first direction. Specifically, the starting winding is placed in first predetermined stator slots each spaced by a predetermined number of stator slots in the first direction from second predetermined stator slots adapted to contain coils in quadrature with the main winding.

The highly desirable use of the current relay operatively transfers the associated pair of contacts from the closed to the open condition in response to the predetermined main winding current to accurately and uniformly disconnect the starting winding when the motor reaches the second predetermined speed whereat the motor torque is at an appreciable magnitude. Such disconnection of the starting winding from the power source effectively prevents overheating within the starting winding even though a substantially small or reduced quantity of wire is used in the starting winding.

The invention thus provides a highly desirable and economical single phase A.C. resistance split-phase unidirectional induction motor which may be utilized in any one of a number of motor applications and is particularly desirable for use within a hermetic motor commonly employed in hermetically sealed compressors or the like in which the heating of the starting winding is a critical factor.

BRIEF DESCRIPTION OF THE DRAWINGS

The drawings furnished herewith illustrate the best mode presently contemplated by the inventor and clearly disclose the above advantages and features as well as others which will be readily understood from the detailed description thereof.

In the drawings.

DESCRIPTION OF THE PREFERRED ILLUSTRATED EMBODIMENT

Figure 1:
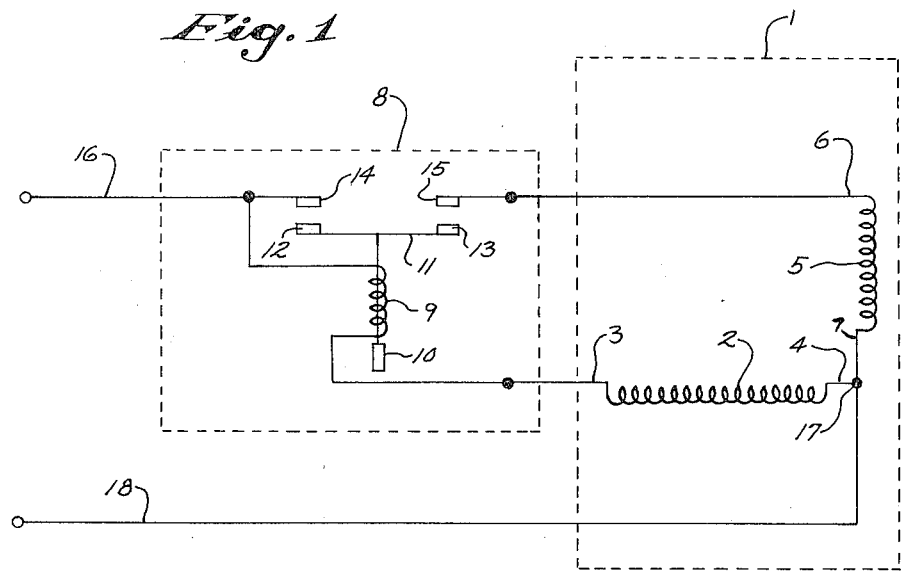
FIG. 1 is an electrical schematic illustrating the employment of a current sensitive relay with a two pole split-phase A.C. motor.

Referring to the drawings and particularly FIG. 1, a two pole split-phase A.C. induction motor 1 is diagrammatically illustrated in an electrical circuit illustration and includes a main field winding generally shown at 2 having input leads 3 and 4 and a starting field winding generally shown at 5 having the input leads 6 and 7.

A current relay is generally shown at 8 and includes a solenoid coil 9 and a steel armature 10 which slides on a nylon guide bushing (not shown) centered in the solenoid coil field. The armature 10 mounts a bridging type contact arm 11 containing a pair of contacts 12 and 13. A fixed contact 14 is spaced from the contact 12 with the coil 9 de-energized while a fixed contact 15 is spaced from the contact 13 under similar circumstances. The solenoid coil 9 is connected to an energizing input lead 16 and to the main field winding 2 through the input lead 3. The fixed contact 14 is also connected to the input lead 16 while the fixed contact 15 is connected to the starting winding 5 through the input lead 6. The output lead 4 of the main field winding 2 and the output lead 7 of the starting field winding 5 are joined as at 17 and connected to an input lead 18.

In operation, the contacts 12 and 13 are normally in an open condition and spaced from the associated contacts 14 and 15 while the coil 9 continually remains series connected with the main field winding 2. A single phase A.C. voltage source is selectively connected to the input leads 16 and 18 to initiate a motor starting sequence by supplying energizing current to the main field winding 2 through the solenoid coil 9. The coil 9 initially experiences a heavy current (the main winding current) and provides a substantial magnetic field which raises the armature 10 to close the contacts 12 – 14 and 13 – 15 to complete an energizing circuit from the source leads 16 and 18 to the starting winding 5. Due to phase displaced currents flowing through the two windings, the motor rotor (not shown) starts rotating and accelerating.

As the motor 1 increases in speed, the current in the main winding 2, and thus the current passing through the solenoid coil 9, decreases until reaching a predetermined magnitude at which point the weight of the armature 10 overcomes the lifting force provided by the current flow through the solenoid 9, thereby opening the contacts 12 – 14 and 13 – 15 to disconnect the starting field winding 5 from the energizing power source lead 16.

Figure 2:
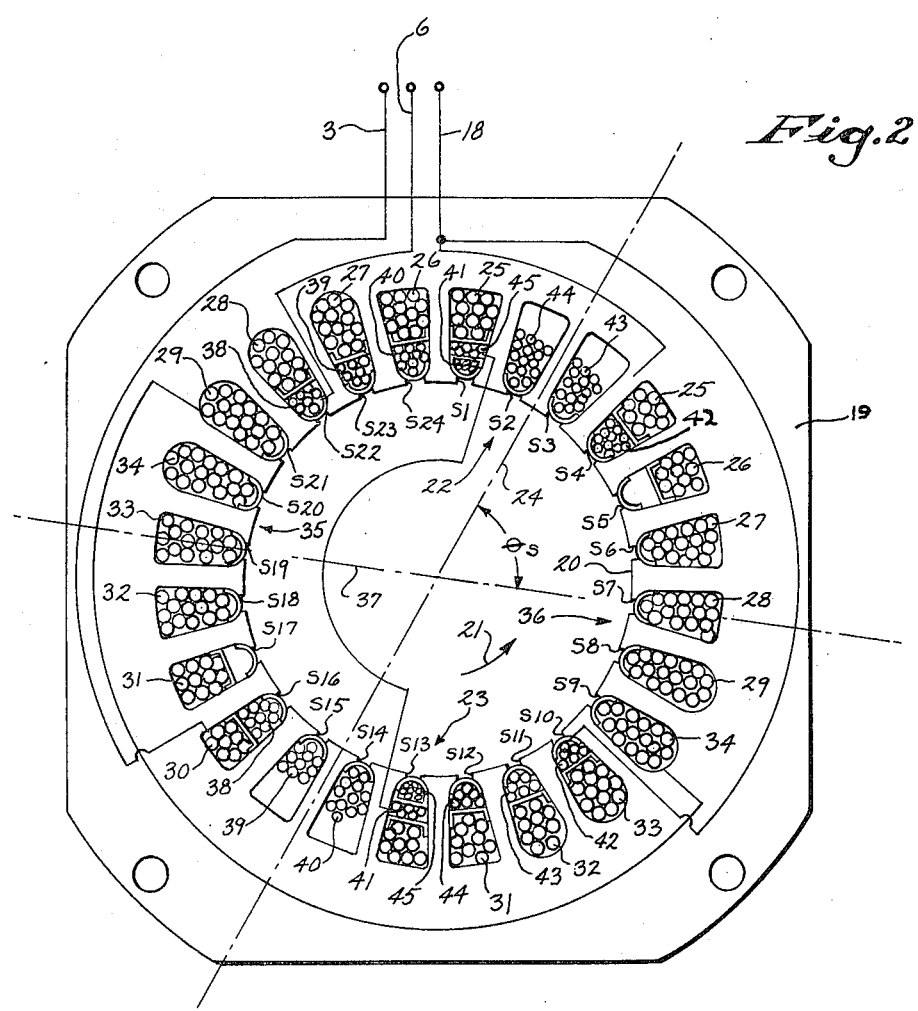
FIG. 2 is a diagrammatic illustration showing a cross section of a stator core assembly illustrating the nonquadrature placement of the starting windings with respect to the main field windings within the motor of FIG. 1.

A stator core assembly 19 is illustrated in FIG. 2 and includes a plurality of stacked and secured laminations of about one and one-half inch in thickness having a centrally located circumferential bore 20. A rotor element (not shown) is mounted within the bore 20 for selective rotation in a first direction such as illustrated by the arrow 21 in FIG. 2. The core 19 also includes a plurality of circumferentially spaced winding slots communicating with the central bore 20 and adapted to receive winding coils constituting the main and starting windings 2 and 5 as more fully described hereinafter. Specifically, 24 stator slots are circumferentially spaced about the stator bore 20 and are specifically designated as S1 through S24, inclusive. The coil placement, within the slots S1 through S24, is diagrammatically illustrated in FIG. 2 by a plurality of circles which represent a plurality of wires making up a coil.

The main winding 2 is wound and placed in the stator slots to form two diametrically opposed poles such as at 22 and 23 which are aligned on the axis shown by the dashed line 24. Each pole 22 and 23 contains five coils placed in certain slots which are series connected with adjacent main winding coils. Specifically, a first main winding coil 25 is wound with 17 turns in a forward direction and placed within the stator slots S4 and S1 and is connected to the return lead 18 at the stator slot S4. A second main winding coil 26 is forward wound with 22 turns and placed within the stator slots S5 and S24 and is serially connected with the coil 25. A third main winding coil 27 is forward wound with 29 turns and placed within the stator slots S6 and S23 and is connected in series with the coil 26. A fourth main winding coil 28 is forward wound with 34 turns and placed within the stator slots S7 and S22 and is connected in series with the coil 27. A fifth main winding coil 29 is forward wound with 39 turns and placed within the stator slots S8 and S21 and is connected in series with the coil 28. The main winding coils 25 through 29 form the pole 22 for the main winding 2.

The oppositely disposed main winding pole 23 includes a first coil 30 forward wound with 17 turns and placed within the stator slots S16 and S13 and is connected to the input lead 3 at the stator slot S16. A second coil 31 is forward wound with 22 turns and placed within the stator slots S17 and S12 and is connected in series with the coil 30. A third main winding coil 32 is forward wound with 29 turns and placed within the stator slots S18 and S11 and is connected in series with the coil 31. A fourth main winding coil 33 is forward wound with 34 turns and placed within the stator slots S19 and S10 and is connected in series with the coil 32. A fifth main winding coil 34 is forward wound with 39 turns and placed within the stator slots S20 and S9. The coil 34 at the stator slot S9 is connected in series with the coil 29 at the stator slot S21.

The starting winding 5 also is wound and placed within certain stator slots in a highly novel manner to form a pair of diametrically opposed poles such as at 35 and 36 which are aligned on the axis shown by the dashed line 37. Specifically, the pole 35 of the starting winding 5 includes a first coil 38 wound in a forward direction with 18 turns and placed within the stator slots S22 and S16 with the coil 38 at slot S22 connected to the input lead 6. A second coil 39 is wound in the forward direction with 27 turns and placed in the stator slots S23 and S15 and is connected in series with the coil 38. A third starting coil 40 is wound in a forward direction with 37 turns and placed within the stator slots S24 and S14 and is connected in series with the coil 39. A fourth starting coil 41 is wound in a forward direction with 17 turns and placed within the stator slots S1 and S13 and is serially connected with the coil 40. The starting coils 38 through 41, inclusive, form the first pole 35 of the starting winding 5.

The pole 36 of the starting winding 5 includes a first coil 42 wound in a forward direction with 18 turns and placed within the stator slots S10 and S4 with the coil 42 at the slot S10 connected to the return lead 18. A second coil 43 is wound in the forward direction with 27 turns and placed within the stator slots S11 and S3 and is connected in series with the coil 42. A third starting coil 44 is wound in the forward direction with 37 turns and placed within the stator slots S12 and S2 and is connected in series with the coil 43. A fourth starting coil 45 is wound in the forward direction with 17 turns and placed within the stator slots S13 and S1 and is connected in series with the coil 44. The coil 45 at the slot S1 is connected in series with the coil 41 of the opposite pole 35 at the stator slot S13. It is noted that the slots S1 and S13 contain both of the starting coils 41 and 45.

The main winding 2 thus includes a series connected circuit including the input lead 3, the coils 25, 26, 27, 28 and 29 within the first main winding pole 22 and the coils 34, 33, 32, 31 and 30 within the second main winding pole 23 with a return path provided through the lead 18. In like manner, the starting winding 5 includes a series connected circuit including the lead 6, the coils 38, 39, 40 and 41 of the first starting winding pole 35 and the coils 45, 44, 43 and 42 of the second starting winding pole 36 with a return connection provided through the lead 18. The series connected main winding 2, in this preferred embodiment, is formed from an aluminum wire having a diameter of 0.048 inches and provides a main winding resistance of 2.080 ohms when formed with the number of turns as above described. The series connected starting winding 5, in this preferred embodiment, is formed from an aluminum wire having a diameter of 0.0253 inches and provides a starting winding resistance of 5.40 ohms when formed with the number of turns as above described.

It is noted that the pole axis 37 for the starting winding 5 is shifted out of 90° spaced quadrature toward the pole axis 24 for the main winding 2 in the direction 21 of rotor rotation by an angle so that $\theta s$ is less than 90°. The predetermined shifting of each of the forward wound starting coils 38 through 45, inclusive, out of spaced quadrature and toward the main winding coils 25 through 34, inclusive, in the direction 21 of rotor rotation functions with the current relay 8 to provide a highly desirable disconnection of the starting winding 5 from the power source lead 16 when the motor 1 has reached a predetermined speed and torque level. Such desirable disconnection is provided without the use of back-turns in the starting winding as provided by various prior single phase fractional horsepower motors. The elimination of the back winding or reverse winding turns is also accompanied by elimination of added forward turns, for the starting winding, which have been employed in prior art, to provide the requisite field for the motor 1.

The advantages of applicant's invention is more clearly illustrated with reference to FIG. 3 which illustrates graphically, a torque curve 46 and a main winding current curve 47 with the current represented in amperes (AMPS.) and the torque in ounce-feet (OZ.-FT.) in the abscissa axis and the speed of rotation of the rotor, represented in revolutions per minute (R.P.M.), in the ordinate axis. In one form of applicant's invention, the current relay 8 has a 12.9 maximum pick-up amperes rating required for closure of the contacts 12 – 14 and 13 – 15 and a 10.8 minimum dropout amperes rating required to open the contacts 12 – 14 and 13 – 15. The relay 8 could constitute a current type KLIXON motor starting relay designated as 9660-171 and manufactured by the Texas Instruments, Inc.

Figure 3:
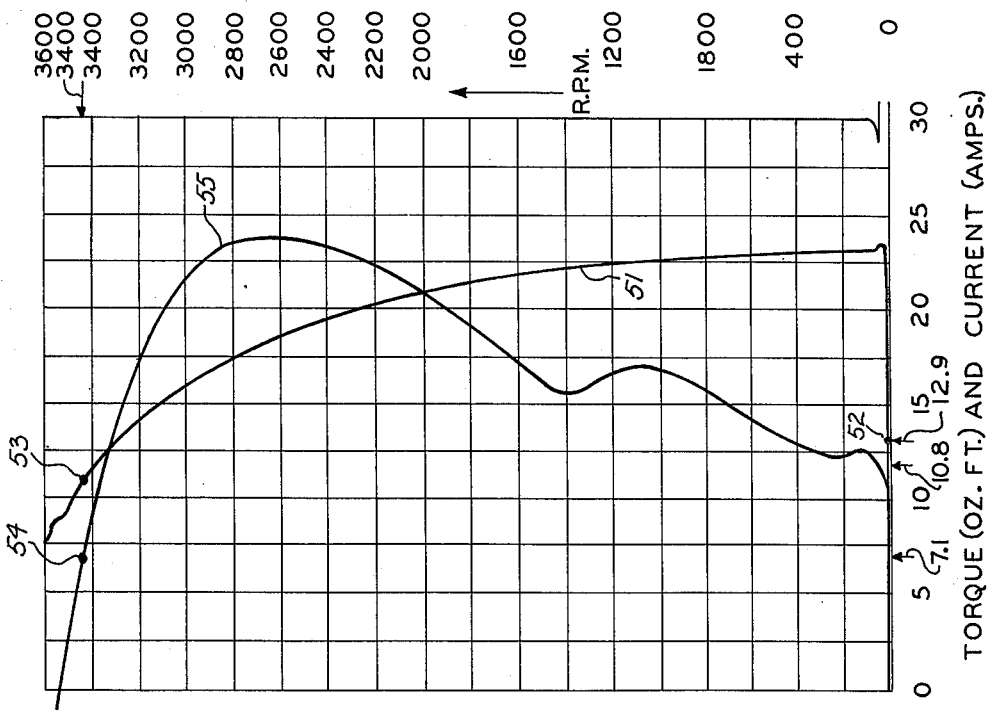
FIG. 3 is a graphical illustration showing the current and torque characteristics as a function of speed for the A.C. motor of FIGS. 1 and 2.

The graphical illustrations shown in FIG. 3 were prepared using an x-y plotter on a torque table from a test of an electric motor such as at 1 in which the coils making up the starting winding 5 were all forward wound and placed in non-quadrature stator slots by shifting the starting winding toward the coils of the main winding by 1 ½ stator slots in the direction of rotor rotation with respect to the stator slots adapted to hold spaced quadrature starting coils. The tested motor for FIG. 3 included a single phase, two pole, split-phase induction motor providing one-fourth horsepower and was connected to a 120 volt, 60 hertz source.

In the operating test illustrated by FIG. 3, the main winding current illustrated at 47 increased beyond the maximum pick-up current of 12.9 amperes almost immediately such as indicated at 48. The main winding current 47 thereafter decreases in response to the increase of rotor speed until reaching 10.8 amperes such as at 49 which constitutes the minimum current dropout magnitude for the illustrated relay 8. When the main winding current 47 decreases to the 10.8 amperes as at 49, the relay 8 disconnects the starting winding 5 from the input lead 16 by opening the contacts 12 – 14 and 13 – 15. It is important to note that the starting winding disconnects from the source lead 16 at the rotor speed of 3,210 R.P.M. while the motor torque output provides a highly desirable 18.3 OZ.-ft. as indicated at 50. Also of extreme importance, the test of the motor illustrated in FIG. 3 experienced a locked rotor starting winding heating rate, measured at 300°F., of 17.2°F. per second. Such a heating rate is well within the tolerable heating limitations imposed particularly upon motors utilized for compressor operations in which hermetic sealing is required.

Figure 4:
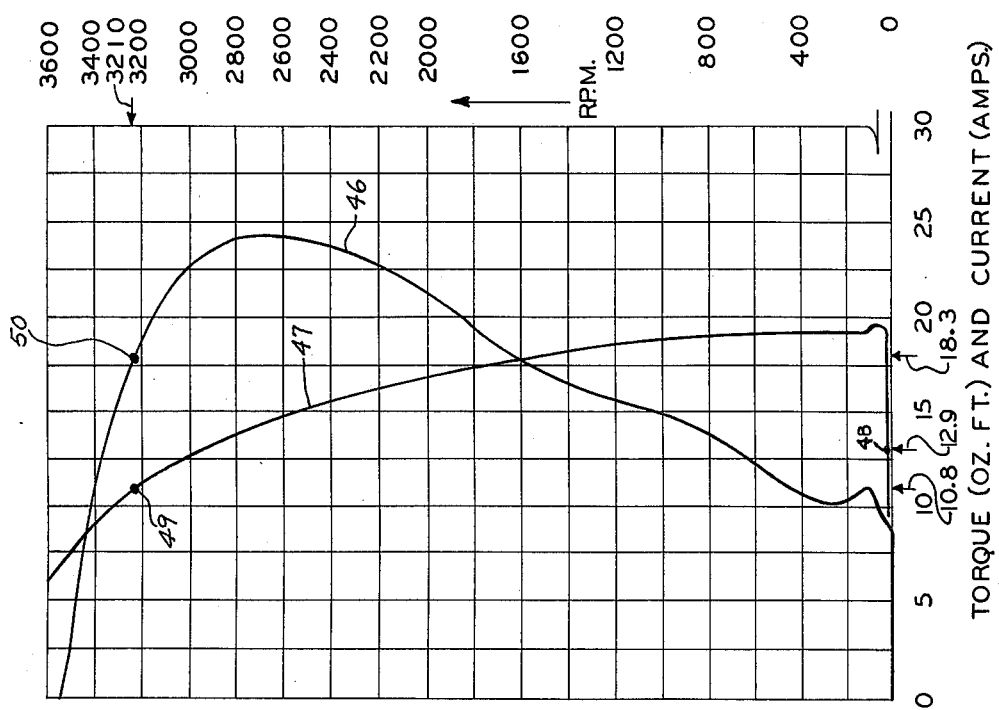
FIG. 4 is a graphical illustration showing the current and torque characteristics of a split-phase induction motor having an all forward turn starting winding spaced in quadrature with the main winding, which does not employ applicant's invention.

The test illustrated in FIG. 4 was upon a split-phase induction motor containing main winding coils which were similarly wound as coils 25 through 34 as described above and connected to a current relay 8 as described above. The motor used for the FIG. 4 test, however, did not employ applicant's invention but rather was wound with four starting coils per pole so as to be spaced in quadrature relationship with the coils of the main winding. Specifically, the first coil of both poles contained 11 turns, the second coil 17 turns, the third 28 turns and the fourth 41 turns. The same size and type of wire was employed as in the motor tested in FIG. 3. The starting winding effective resistance was measured at 5.32 ohms.

In the operating test illustrated in FIG. 4, the main winding current illustrated at 51 increases beyond the maximum pick-up current of 12.9 amperes almost immediately such as indicated at 52. As the rotor started to rotate and accelerate, the main winding current decreased in response to the increasing speed of the tested motor. When the main winding current 51 decreased to the 10.8, the minimum drop-out current of the relay, as at 53 required for the current relay such as at 8 to disconnect the starting windings such as 5, the motor speed has increased to an exceeding high 3,430 R.P.M. whereat the output torque had decreased to an undesirably low 7.1 oz.-ft. as shown at 54 on the torque curve 55. Of crucial importance, the locked rotor starting winding heating rate, which was measured at 300°F., was an excessive 26.1°F. per second; far exceeding the desirable and acceptable heating rates for such motors. As indicated previously, back windings or reverse turns have been commonly utilized by the industry within the starting winding of motors, such as tested in the FIG. 4 example, to reduce the excessive heat buildup while additional forward turns, corresponding to the reverse turns, have been utilized in the starting to provide a sufficient field to interact with the main winding field and provide the requisite torque at relay drop out.

A highly desirable resistance split-phase dynamoelectric machine is thus provided in which the starting field winding is selectively disconnected by a current relay functioning to uniformly provide such disconnection at a predetermined speed and torque level and at a predetermined main winding current within predetermined starting winding temperature limitations without requiring back windings within the starting windings and which may be hermetically sealed and conveniently used within a compressor system. While it is desirable to completely eliminate all reverse or back turns, it should be understood that the invention could be utilized with some reverse or back turns constituting a minimal number of turns as compared with many prior art structures utilizing such back turns.

Various modes of carrying out the invention are contemplated as being within the scope of the following claims particularly pointing out and distinctly claiming the subject matter which is regarded as the invention.

I claim:

1. A single phase, two pole A.C. split-phase unidirectional induction motor of the resistance split-phase type comprising a source of single phase A.C. electrical power, a stator core assembly having a plurality of circumferentially spaced coil receiving slots communicating with a substantially cylindrical bore, a rotor assembly mounted within said cylindrical bore for selective rotation in a first direction, a single main winding having a plurality of coils located within less than all of said slots and spaced on opposite sides of said bore with empty stator slots therebetween to form a single pair of main winding electrical poles and a main field axis, a single starting winding having a plurality of coils located within less than all of said slots and correspondingly spaced on opposite sides of said bore with slots therebetween filled with said starting winding to form a single pair of starting winding electrical poles and a single starting field axis electrically spaced out of quadrature from said main field axis with a plurality of said starting winding coils spaced from a plurality of said main winding coils by less than ninety physical degrees in the first direction for providing a predetermined main winding current at a predetermined speed corresponding to a predetermined torque, and current responsive switch means connected to said source and to said main winding and sensing the main winding current and including means selectively connecting said source to said starting winding, said switch means operating to sense said predetermined main winding current to operate said connecting means to disconnect said starting winding form said power source at said predetermined speed for maintaining the heating of said starting winding within a predetermined temperature.

* * * * *

UNITED STATES PATENT AND TRADEMARK OFFICE
CERTIFICATE OF CORRECTION

PATENT NO. : 3,976,924
DATED : August 24, 1976
INVENTOR(S) : Chandu R. Vanjani

It is certified that error appears in the above-identified patent and that said Letters Patent are hereby corrected as shown below:

Column 1, Line 49,  Cancel "hve" and substitute therefor ---have---;

Column 7, Line 44,  Cancel "02.-ft." and substitute therefor ---oz.-ft.---;

Column 10, Line 1, CLAIM 1  Cancel "form" and substitute therefor ---from---.

Signed and Sealed this

Eighth Day of March 1977

[SEAL]

Attest:

RUTH C. MASON
Attesting Officer

C. MARSHALL DANN
Commissioner of Patents and Trademarks